(12) United States Patent
Gupta

(10) Patent No.: US 10,082,418 B2
(45) Date of Patent: *Sep. 25, 2018

(54) FIBER-OPTIC WEIGHT MANAGEMENT MAT WITH MICROBEND INDUCERS

(71) Applicant: Amit Kumar Gupta, Fremont, CA (US)

(72) Inventor: Amit Kumar Gupta, Fremont, CA (US)

(*) Notice: Subject to any disclaimer, the term of this patent is extended or adjusted under 35 U.S.C. 154(b) by 164 days.

This patent is subject to a terminal disclaimer.

(21) Appl. No.: 15/064,812

(22) Filed: Mar. 9, 2016

(65) Prior Publication Data

US 2016/0187181 A1    Jun. 30, 2016

Related U.S. Application Data

(63) Continuation-in-part of application No. 14/166,227, filed on Jan. 28, 2014, now Pat. No. 9,304,031.

(60) Provisional application No. 61/758,974, filed on Jan. 31, 2013, provisional application No. 61/779,061, filed on Mar. 13, 2013.

(51) Int. Cl.
  *G01G 3/12*   (2006.01)
  *G01G 19/44*  (2006.01)
  *G01L 1/24*   (2006.01)

(52) U.S. Cl.
  CPC ............ *G01G 3/125* (2013.01); *G01G 19/44* (2013.01); *G01L 1/245* (2013.01)

(58) Field of Classification Search
  CPC ......... G01G 3/125; G01G 19/44; G01L 1/245
  See application file for complete search history.

(56) References Cited

U.S. PATENT DOCUMENTS

| | | | |
|---|---|---|---|
| 4,294,513 A | | 10/1981 | Nelson |
| 4,421,979 A | * | 12/1983 | Asawa ............... G01L 1/245 250/227.16 |
| 4,459,477 A | * | 7/1984 | Asawa ............... G01L 1/245 250/227.16 |
| 4,463,254 A | * | 7/1984 | Asawa ............... G01L 1/245 250/227.16 |
| 4,465,151 A | | 8/1984 | Gorman |
| 4,477,725 A | * | 10/1984 | Asawa ............... G01L 1/245 250/227.16 |
| 4,560,016 A | | 12/1985 | Ibanez |
| 4,781,056 A | | 11/1988 | Noel |
| 4,918,305 A | | 4/1990 | Wlodarczyk |

(Continued)

*Primary Examiner* — Randy Gibson
(74) *Attorney, Agent, or Firm* — Neustel Law Offices

(57) ABSTRACT

A weight management mat for passively and automatically monitoring weight for one or more individuals in a household. The weight management mat generally includes a housing having an upper mat and a lower mat between which is sealed a pair of perpendicular sensor arrays. Each sensor array includes fiber optic cables laid out in a grid pattern. One or more microbend inducers act to induce detectable microbends in the fiber optic cables when an individual steps on the upper mat. The change in light intensity caused by these microbends is recorded by photodetectors and processed by a microcontroller. The present invention may be utilized to identify each unique individual stepping on the present invention by the pressure map of their feet. Thus, recorded weight measurements may be tracked to aid in weight management.

15 Claims, 12 Drawing Sheets

(56) References Cited

U.S. PATENT DOCUMENTS

| | | | |
|---|---|---|---|
| 5,138,152 A * | 8/1992 | Botting | G01L 1/245 |
| | | | 250/227.16 |
| 5,357,813 A | 10/1994 | Weinberger | |
| 6,920,256 B2 | 7/2005 | Murad | |
| 7,239,724 B2 * | 7/2007 | Sznba | A61B 5/11 |
| | | | 177/25.11 |
| 7,437,028 B2 * | 10/2008 | Hohne | G01L 1/245 |
| | | | 250/227.14 |
| 8,513,544 B2 * | 8/2013 | Eckerdt | A47G 29/10 |
| | | | 177/245 |
| 9,304,031 B1 * | 4/2016 | Gupta | G01G 19/44 |
| 2006/0008197 A1 | 1/2006 | Hohne | |

\* cited by examiner

US 10,082,418 B2

FIBER-OPTIC WEIGHT MANAGEMENT MAT WITH MICROBEND INDUCERS

CROSS REFERENCE TO RELATED APPLICATIONS

The present application is a continuation-in-part of U.S. application Ser. No. 14/166,277 filed on Jan. 28, 2014, which claims priority to U.S. Provisional Application No. 61/758,974 filed Jan. 31, 2013 and U.S. Provisional Application No. 61/779,061 filed Mar. 13, 2013. Each of the aforementioned patent applications, and any applications related thereto, is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to a fiber-optic weight management mat for passively and automatically monitoring weight for one or more individuals in a household.

Related Art

Any discussion of the related art throughout the specification should in no way be considered as an admission that such related art is widely known or forms part of common general knowledge in the field.

Bathroom scales are common in households to aid in monitoring of an individual's weight for weight management. The prior art method of weight monitoring generally requires an individual to actively seek, then stand on, a conventional weight scale to display their weight. The individual will have to manually record the weight data generally utilizing conventional recording methods, such as a pen and paper.

The present invention can automate the weight measurement and recording process imperceptibly. By utilizing a conventional mat design, the present invention can aid in establishing a habit of stepping on the mat upon exiting or entering a shower or bath.

SUMMARY

An example embodiment of the present invention is directed to a fiber-optic weight management mat. The fiber-optic weight management mat includes a housing having an upper mat and a lower mat between which is sealed a pair of perpendicular sensor arrays. Each sensor array includes fiber optic cables laid out in a grid pattern. One or more microbend inducers act to induce detectable microbends in the fiber optic cables when an individual steps on the upper mat. The change in light intensity caused by these microbends is recorded by photodetectors and processed by a microcontroller. The present invention may be utilized to identify each unique individual stepping on the present invention by the pressure map of their feet. Thus, recorded weight measurements may be tracked to aid in weight management.

There has thus been outlined, rather broadly, some of the features of the fiber-optic weight management mat in order that the detailed description thereof may be better understood, and in order that the present contribution to the art may be better appreciated. There are additional features of the fiber-optic weight management mat that will be described hereinafter and that will form the subject matter of the claims appended hereto. In this respect, before explaining at least one embodiment of the fiber-optic weight management mat in detail, it is to be understood that the fiber-optic weight management mat is not limited in its application to the details of construction or to the arrangements of the components set forth in the following description or illustrated in the drawings. The fiber-optic weight management mat is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Figure 1:
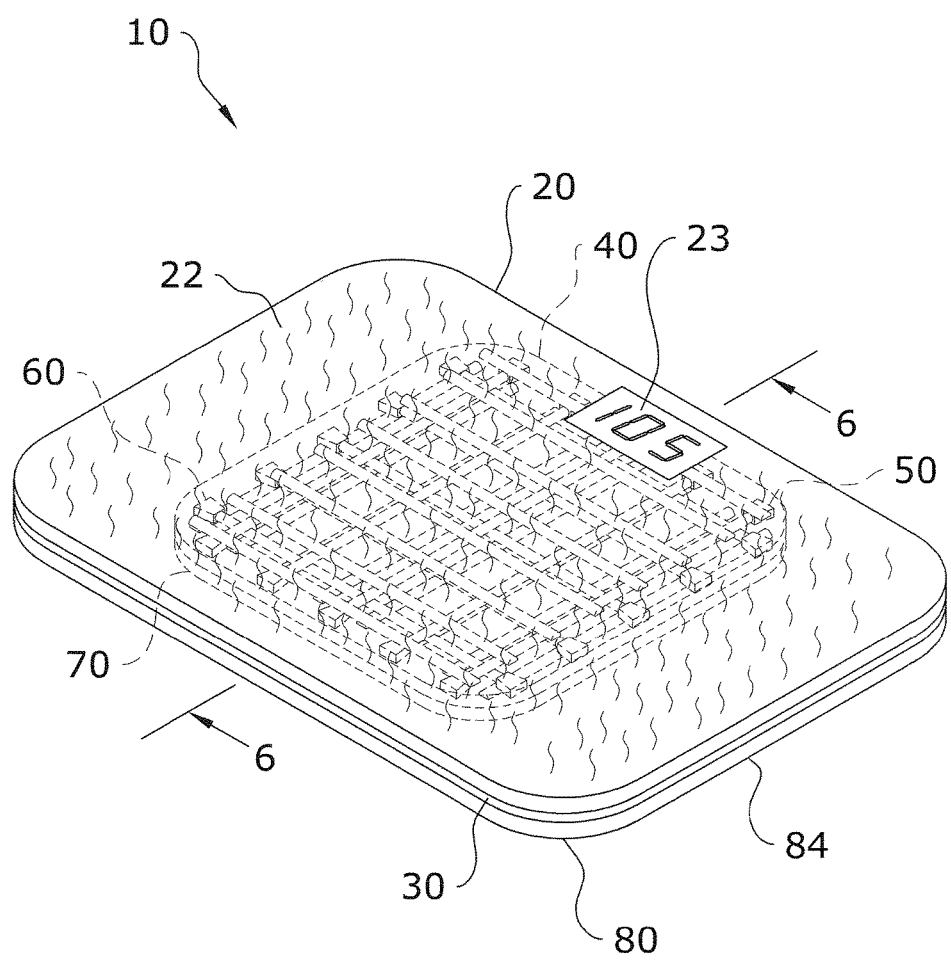
FIG. 1 is an upper perspective view of the present invention.

Turning now descriptively to the drawings, in which similar reference characters denote similar elements throughout the several views, FIGS. 1 through 7 illustrate a weight management mat 10, which comprises a housing having an upper mat 20 and a lower mat 80 between which is sealed a pair of perpendicular sensor arrays 50, 60. Each sensor array 50, 60 includes fiber optic cables 52, 62 laid out in a grid pattern. One or more microbend inducers 40, 70 act to induce detectable microbends in the fiber optic cables 52, 62 when an individual steps on the upper mat 20. The change in light intensity caused by these microbends is recorded by photodetectors 58, 68 and processed by a microcontroller 92. The present invention may be utilized to identify each unique individual stepping on the present invention by the pressure map of their feet. Thus, recorded weight measurements may be tracked to aid in weight management.

B. Upper and Lower Mats

Figure 2:
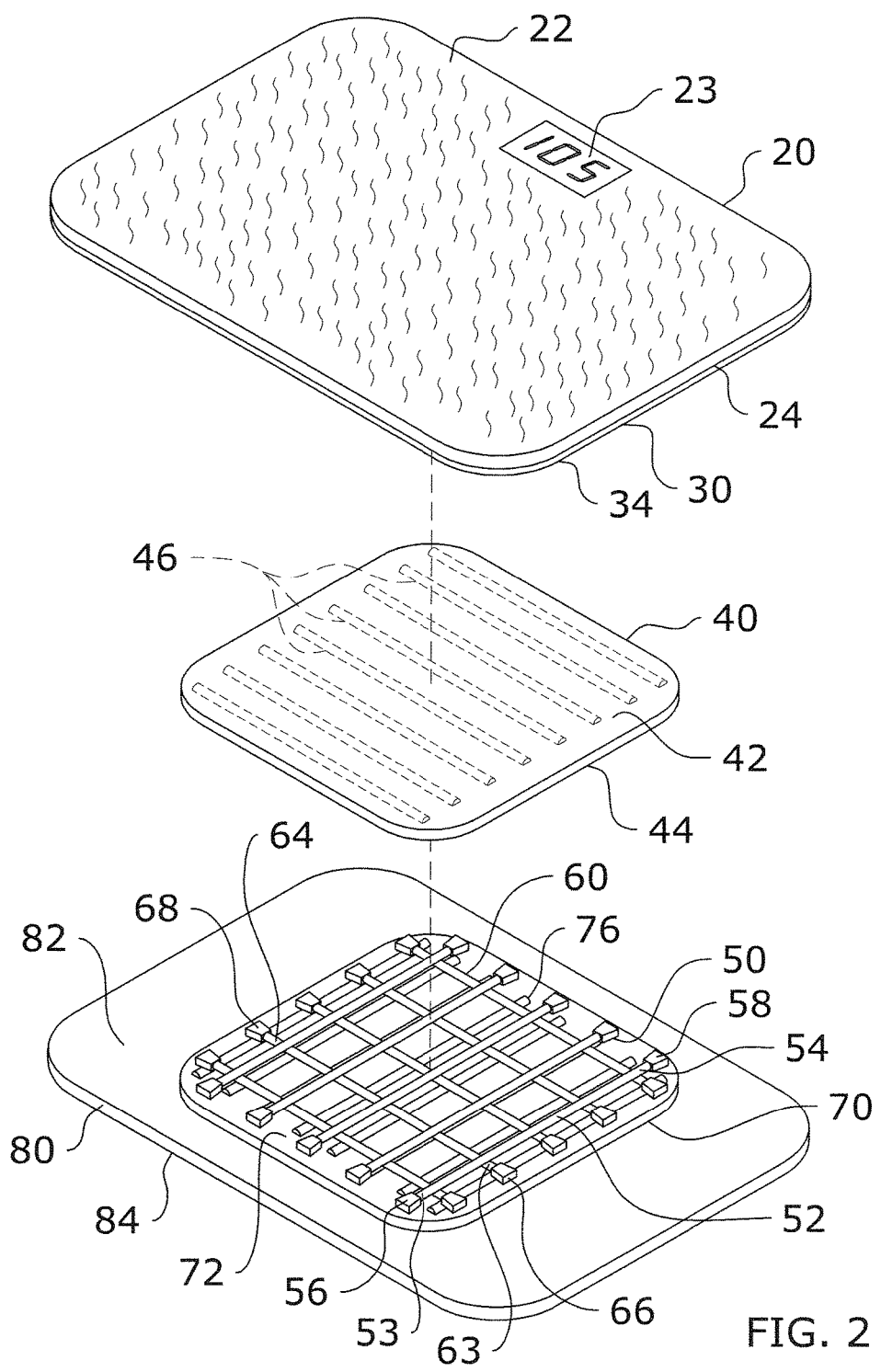
FIG. 2 is an upper perspective exploded view of the present invention illustrating the upper microbend inducer and sensor arrays.
Figure 3:
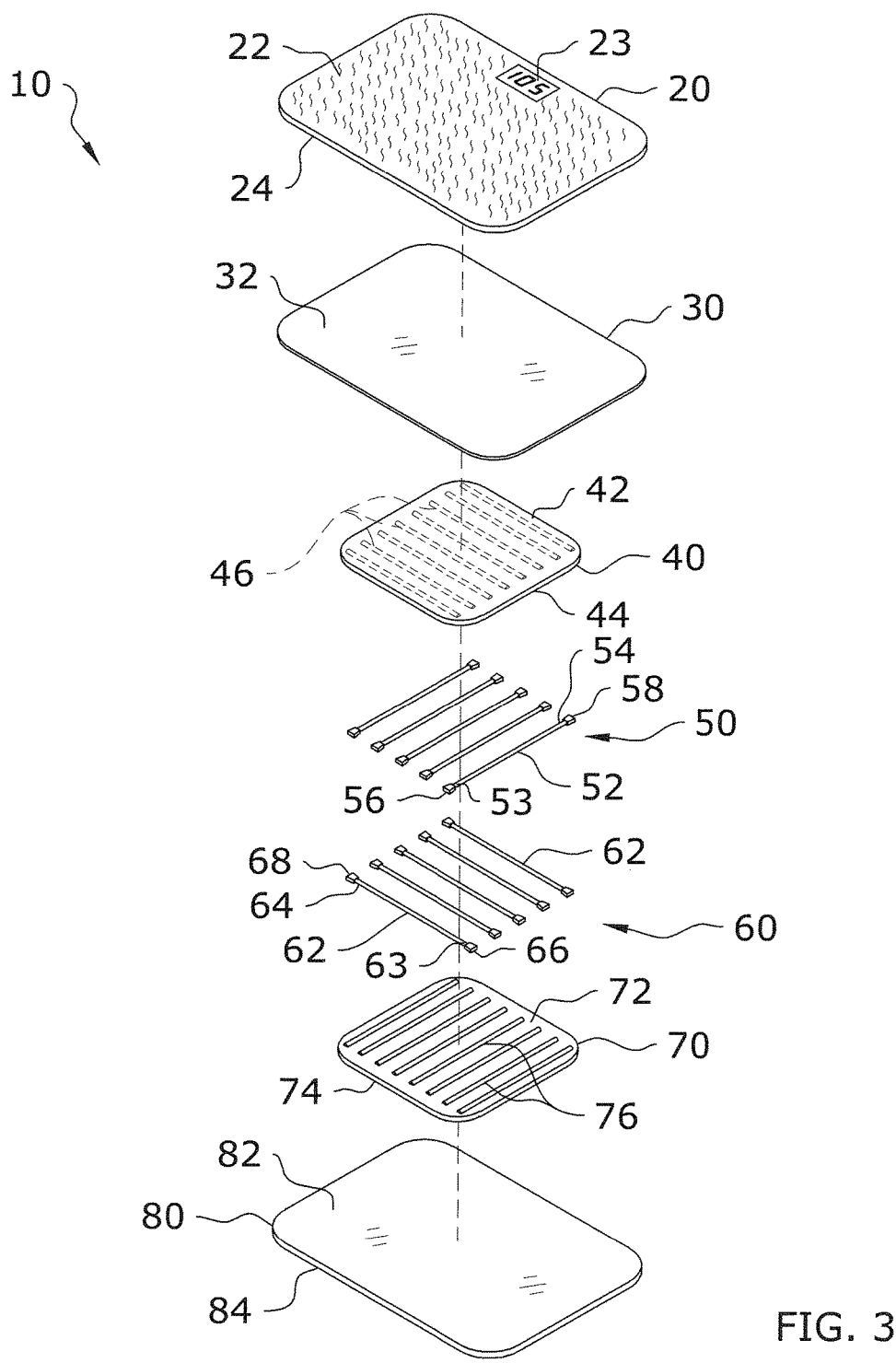
FIG. 3 is an exploded view of the present invention.

As best shown in FIGS. 1-3, the outer surfaces of the present invention generally comprise an upper mat 20 sealed against a lower mat 80 to form the outer structure of the present invention. The upper and lower mats 20, 80 may be integrally formed or discrete structures secured to each other. The upper and lower mats 20, 80 will preferably be of a construction to resemble a traditional bathroom mat.

The upper mat 20 includes an upper surface 22 and a lower surface 24. The upper mat 20 is generally flexible and may be comprised of various materials which are conventionally used in bathroom mats, such as cotton or the like. The upper mat 20 may in some embodiments be comprised of a water-absorbing material. The upper surface 22 of the upper mat 20 is stood upon by an individual utilizing the present invention, such as after taking a shower or bath. The lower surface 24 of the upper mat 20 faces the moisture barrier 30 of the present invention.

The upper surface 22 of the upper mat 20 may also include a display 23. Various types of displays 23 known to work in bathroom scales or other similar devices may be utilized with the present invention. The display 23 is utilized to show the weight of an individual and, in some embodiments, an identification of the individual detected by the present invention.

The lower mat 80 contacts the ground when the present invention is in use. Thus, the lower mat 80 will preferably be comprised of a flexible, anti-slip material which prevents the present invention from slipping on a wet surface such as a bathroom floor. In a preferred embodiment, the lower mat 80 is comprised of polyurethane or a similar material. In some embodiments, the lower surface 84 of the lower mat 80 may include an anti-slip material, while the upper surface 82 of the lower mat 80 need not necessarily have anti-slip properties.

C. Moisture Barrier

To protect the internal electronics of the present invention, one or more moisture barriers 30 may be utilized. In the embodiment shown in the figures, a moisture barrier 30 is positioned underneath the upper mat 20 against its lower surface 24. The moisture barrier 30 may be comprised of various materials known to prevent incursion of moisture into an enclosed area, such as polyvinyl chloride (PVC).

As best shown in FIG. 3, the moisture barrier 30 will preferably be the same shape and size as both the upper and lower mats 20, 80. The upper surface 32 of the moisture barrier 30 may be sealed against the lower surface 24 of the upper mat 20. The lower surface 34 of the moisture barrier 30 may be sealed against the upper surface 82 of the lower mat 80 to seal and enclose the internal electronics of the present invention, such as shown in FIG. 1.

It should be appreciated that the configuration and placement of the moisture barrier 30 may vary in different embodiments of the present invention. For example, in some embodiments, the moisture barrier 30 may be positioned underneath the internal electronics of the present invention instead of over them. In other embodiments, a pair of moisture barriers 30 may be utilized to seal the internal electronics from either side. In other embodiments in which the upper and lower mats 20, 80 are adequately sealed, the moisture barrier 30 may be omitted entirely.

D. Sensing Assembly

The present invention utilizes a sensing assembly comprising internal electronics which is adapted to perform the various functions of the present invention. Preferably, the sensing assembly will utilize microbend inducers 40, 70 and sensor arrays 50, 60 in combination with controllers 90, 92 to both weight and biometrically identify an individual based on their unique foot pressure map.

Figure 4:
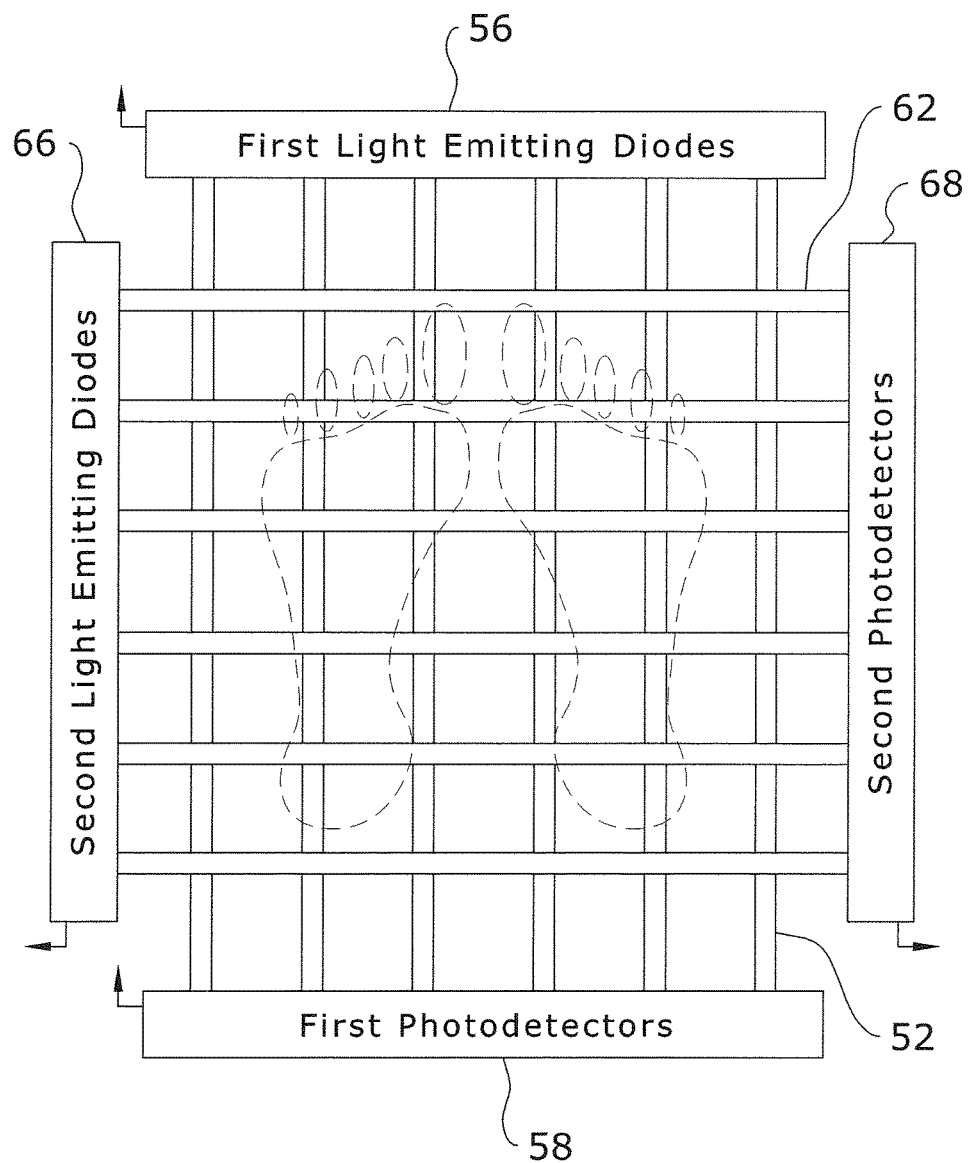
FIG. 4 is a top view block diagram showing the configuration of the sensor arrays of the present invention.
Figure 5:
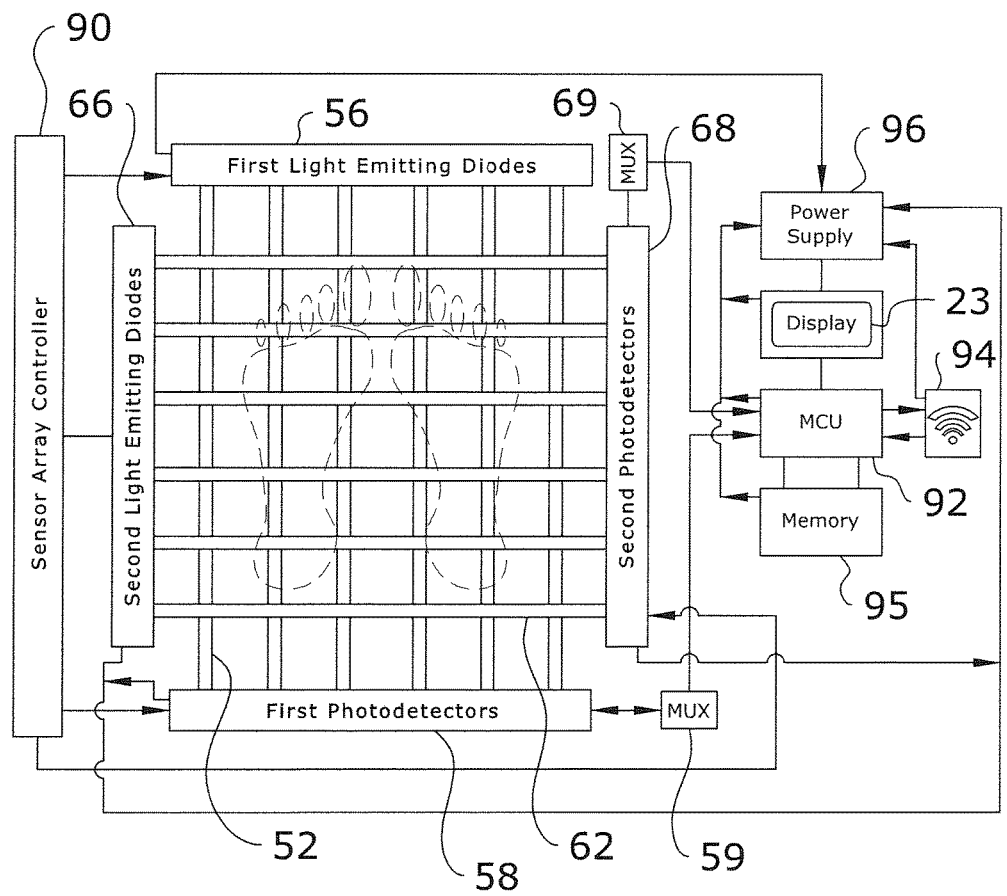
FIG. 5 is a block diagram showing the various internal components of the present invention.

A preferred embodiment of the sensing assembly is best shown in FIGS. 3-5. In such an embodiment, intensity based fiber optic sensor arrays 50, 60 are positioned perpendicularly with respect to each other to form a grip of fiber optic cables 52, 62. Each fiber optic cable 52, 62 includes a light source 56, 66 to provide an input signal to the fiber optic cables 52, 62 of a specific wavelength.

Microbend inducers 40, 70 are utilized to induce microbends in the fiber optic cables 52, 62. These microbends are detected by one or more photodetectors 58, 68 which measure the output signals of the fiber optic cables 52, 62. Using this methodology, a unique pressure map of the individual's feet may be recorded and stored to later identify an individual. The sensing assembly also is utilized to measure the individual's weight.

i. Microbend Inducers.

As best shown in FIGS. 2-6, the present invention utilizes microbend inducers 40, 70 which act to induce microbends in the sensor arrays 50, 60 to be detected by the photodetectors 58, 68. The configuration and type of microbend inducers 40, 70 shown and described herein is merely exemplary and should not be construed as limiting on the scope of the present invention. Various methods and structures known in the art to induce detectable microbends in fiber optics may be utilized with the present invention.

In a preferred embodiment as shown in the figures, an upper microbend inducer 40 is positioned over the first sensor array 50 and a lower microbend inducer 70 is positioned under the second sensor array 60. The upper surface 42 of the upper microbend inducer 40 is generally secured against or integrally formed with the moisture barrier 30 or, in embodiments omitting a moisture barrier 30, the lower surface 24 of the upper mat 20. The lower surface 74 of the lower microbend inducer 70 is generally secured against or integrally formed with the upper surface 82 of the lower mat 80. In some embodiments, the lower surface 74 of the lower microbend inducer 70 may be secured against or integrally formed with a moisture barrier 30.

Figure 6:
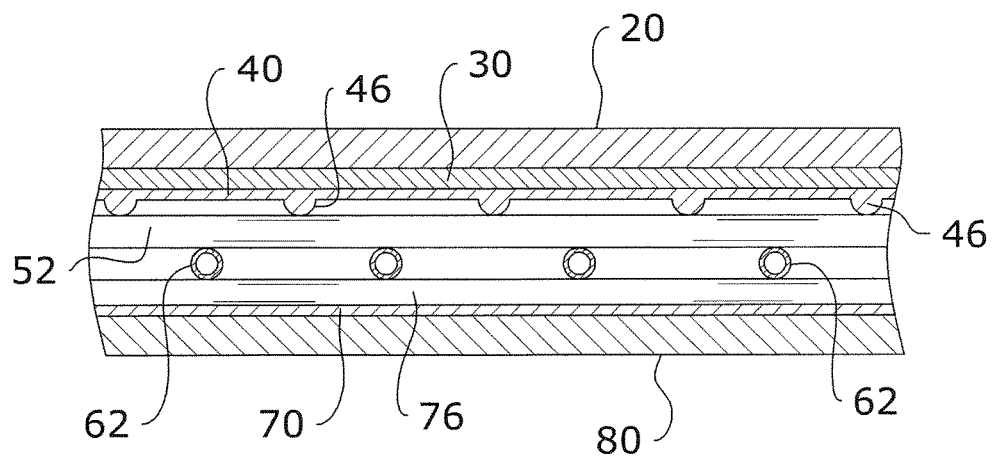
FIG. 6 is a side sectional view of a first embodiment of the present invention.

As best shown in FIG. 3, the upper microbend inducer 40 includes a plurality of first microbend inducement members 46 extending across its lower surface 44. The first microbend inducement members 46 may be comprised of raised splines extending across the lower surface 44 of the upper microbend inducer 40 as best shown in FIG. 6. The first microbend inducement members 46 each extend in parallel with each other in a direction perpendicular with respect to the fiber optic cables 52 of the first sensor array 50.

The lower microbend inducer 70 similarly includes a plurality of second microbend inducement members 76 extending across its upper surface 72. The second microbend inducement members 76 may similarly be comprised of raised splines extending across the upper surface 72 of the lower microbend inducer 70 as best shown in FIG. 3. The second microbend inducement members 76 each extend in parallel with each other in a direction perpendicular with respect to the fiber optic cables 62 of the second sensor array 60. Thus, the second microbend inducement members 76 also extend perpendicularly with respect to the first microbend inducement members 46.

The microbend inducement members 46, 76 will preferably be spaced with a value equal to the mechanical periodicity of each sensor array 50, 60. The mechanical periodicity of each sensor array 50, 60 is generally a characteristic of their components (i.e. the fiber optic cables 52, 62, light sources, 56, 66, and/or the photodetectors 58, 68).

For example, the first microbend inducement members 46 may be spaced with relation to the mechanical periodicity of the first sensor array 50 and the second microbend inducement members 76 spaced with relation to the mechanical periodicity of the second sensor array 60.

Figure 7:
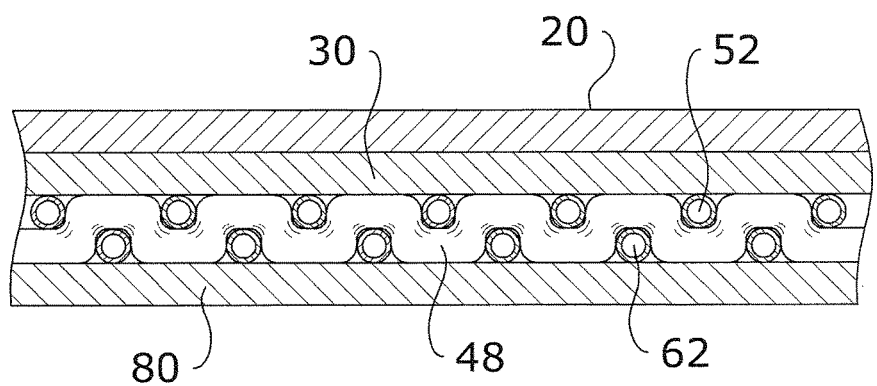
FIG. 7 is a side sectional view of a second embodiment of the present invention.
Figure 8:
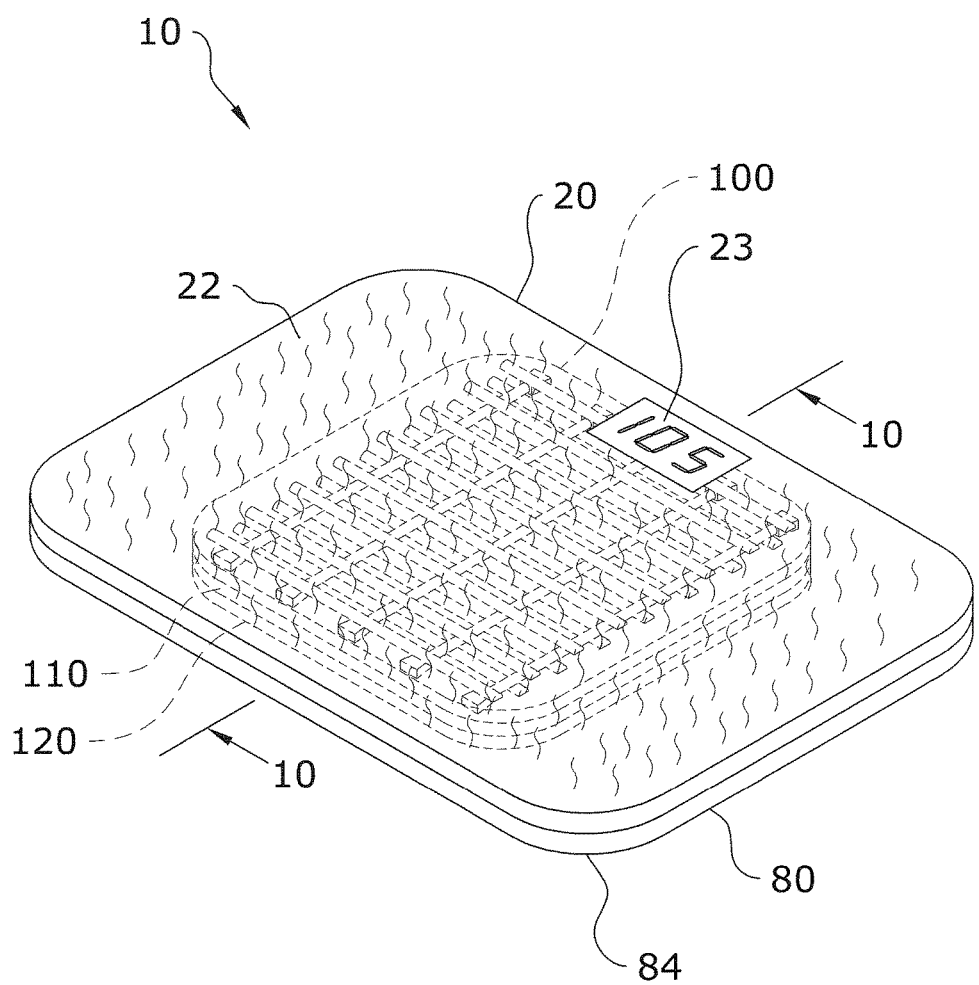
FIG. 8 is an upper perspective view of an alternate embodiment.

FIG. 7 illustrates a cross-section of an embodiment of the present invention in which an alternative method of generating the microbending in the sensor arrays 50, 60 is used. In this configuration the fiber optic cables 52, 62 are laid in a crosshatch pattern 48. The crosshatch will be in a pattern with the interweaving between the top and bottom fiber optic cables at a frequency of the mechanical periodicity that is characteristic of the sensor arrays 50, 60 (consisting of the fiber optic cable, LED and photodetector).

ii. Sensor Arrays.

The present invention utilizes a pair of perpendicularly-oriented sensor arrays 50, 60 for performing various functionalities such as measuring weight or identifying an individual. Each sensor array 50, 60 generally comprises a plurality of light conducting conduits such as fiber optic cables 52, 62. It should be appreciated that various light conducting media may be utilized within the sensor arrays 50, 60 of the present invention.

In a preferred embodiment as best shown in FIGS. 2-6, a first sensor array 50 comprises a first plurality of parallel fiber optic cables 52. The second sensor array 60 comprises a second plurality of parallel fiber optics 62 which are oriented perpendicularly with respect to the first plurality of parallel fiber optics 52 to form a mesh grid pattern to form an X-Y coordinate map as best shown in FIGS. 2 and 3. Each of the fiber optic cables 52, 62 will preferably operate in single transmission mode and make use of microbending to aid in measuring the effect of the weight on the fiber optic cables 52, 62 and translate to a measurable signal.

The individual sensor arrays 50, 60 and their orientation with respect to each other is best shown in FIGS. 3 and 4. As shown therein, the first sensor array 50 comprises a plurality of fiber optic cables 52 oriented in parallel with respect to each other. The second sensor array is similarly comprised of a plurality of fiber optic cables 62 oriented in parallel with respect to each other. In some embodiments, the sensor arrays 50, 60 may be operated with a Bragg grating to measure a weight-modified signal.

The numbering and spacing of the fiber optic cables 52, 62 within the first sensor array 50 and second sensor array 60 may vary in different embodiments. The fiber optic cables 52, 62 may be spaced with a value equal to the characteristic mechanical periodicity of each respective sensor array 50, 60, which is generally a characteristic of the components thereof, such as the fiber optic cables 52, 62 themselves, the light sources 56, 66, and/or the photodetectors 58, 68.

The orientation of the fiber optic cables 52 within the first sensor array 50 is preferably perpendicular with respect to the first microbend inducement members 46 so that a plurality of intersectional pressure points are formed as shown in FIGS. 4 and 5. Similarly, the orientation of the fiber optic cables 62 within the second sensor array 60 is preferably perpendicular with respect to the second microbend inducement members 76. These pressure points are utilized to create microbeads within the sensor arrays 50, 60 which are detectable via usage of photodetectors 58, 68.

One or more light sources 56, 66 act as inputs to the fiber optic cables 52, 62 of the sensor arrays 50, 60. The light sources 56, 66 will preferably emit an input signal of a specific wavelength (infra-red, visible red, etc.) through the fiber optic cables 52, 62 of each sensor array 50, 60. Various types of light sources 56, 66 may be utilized, such as light emitting diodes (LED). Microbends induced in the fiber optic cables 52, 62 by the microbend inducers 40, 50 will be detectable by one or more photodetectors 58, 68 at the output of the fiber optic cables 52, 62.

In a preferred embodiment, one or more first light sources 56 act as an input to the first ends 53 of the fiber optic cables 52 of the first sensor array 50. Similarly, one or more second light sources 66 act as inputs to a first end 63 of the fiber optic cables 62 of the second sensor array 60. One such embodiment is shown in FIG. 3, wherein each fiber optic cable 52 of the first sensor array 50 includes a first light source 56 at its first end 53 and each fiber optic cable 62 of the second sensor array 60 includes a second light source 66 at its first end 63.

The present invention utilizes photodetectors 58, 68 to detect a change in the intensity of light signals being carried within the sensor arrays 50, 60. The intensity change is caused by the microbends in the fiber optic cables 52, 62 of the sensor arrays 50, 60. By detecting the change in intensity of signals within the sensor arrays 50, 60, the present invention may measure the change in wavelength of the signals through the fiber optic cables 52, 62 as a function of applied weight and pressure.

The photodetectors 58, 68 may be comprised of any light-detecting media with sensitivity to detect the signals emitted by the light sources 56, 66 as well as changes in intensity thereof, such as increases in attenuation caused by microbending. In preferred embodiments, the photodetectors 58, 68 may be comprised of phototransistors or photodiodes.

In a preferred embodiment, one or more first photodetectors 58 are positioned at the second ends 54 of the fiber optic cables 52 of the first sensor array 50. Similarly, one or more second photodetectors 68 are positioned at the second ends 64 of the fiber optic cables 62 of the second sensor array 60. One such embodiment is shown in FIG. 3, wherein each fiber optic cable 52 of the first sensor array 50 includes a first photodetector 58 at its second end 54 and each fiber optic cable 62 of the second sensor array 60 includes a second photodetector 68 at its second end 64.

As best shown in FIG. 5, the first photodetectors 58 of the first sensor array 50 are connected to a first multiplexer 59 and the second photodetectors 68 of the second sensor array 60 are connected to a second multiplexer 69. The multiplexers 59, 69 each combine the multiple signals received from the photodetectors 58, 68 into a single signal to be transmitted to the microcontroller unit 92. The first multiplexer 59 and the second multiplexer 69 are each adapted to generate a single output in the form of X-Y coordinates of each of the sensor arrays 50, 60 corresponding to the detected pressure points activated due to the person's weight.

E. Controllers

The present invention will utilize one or more controllers 90, 92 for operating the various functionalities of the present invention. In a preferred embodiment as shown in FIG. 5, a sensor array controller 90 may be utilized to control the operation of the sensor arrays 50, 60, including the light sources, 56, 66 and photodetectors 58, 68. The sensor array controller 90 may be comprised of circuitry, an integrated circuit, or other electrical components necessary to operate the sensor arrays 50, 60. In some embodiments, the functions of the sensor array controller 90 may be perfot med partially or wholly by the microcontroller unit 92 described below.

As best shown in FIG. 5, a microcontroller unit (MCU) 92 is included to provide the overall functionality of the present invention. The MCU 92 processes the data received from the sensor arrays 50, 60 and coordinates all processing activities of the various components of the present invention. As noted above, the MCU 92 may be integrated with and perform all functions of the sensor array controller 90, or may be comprised of a separate controlling system from the sensor array controller 90.

The MCU 92 will generally contain firmware adapted to coordinate the operation of the present invention. Various types of microcontroller units 92 may be utilized with the present invention, and the present invention should not be construed as being limited to any particular microcontroller unit 92. The functions of the microcontroller unit 92 within the present invention may in some embodiments be distributed among multiple processors or microcontroller units 92.

As shown in FIG. 5, the present invention may also utilize a wireless transceiver 94 to transmit data such as weight readings to a separate device such as a phone, tablet computer, laptop, or personal computer via wireless communications. The wireless transceiver 94 may also be utilized to update the firmware of the present invention. Various wireless communication types may be utilized, including WI-FI, BLUETOOTH, 3G, 4G, infrared, and the like. In some cases, the wireless transceiver 94 may transmit data to a cloud-based server to store and analyze the data at a later time.

The present invention may also include memory 95 for storing various data utilized for performing its various functions. Various types of memory 95 may be utilized, though in a preferred embodiment non-volatile memory 95 type. The memory 95 is primarily utilized to store a database of pressure map readings to aid in identifying users of the present invention. The memory 95 may also be utilized for various other functions, such as storing weight readings for weight management.

The present invention will also generally include at least one power supply 96 for providing power to its various components. Various types of power supplies 96 may be utilized, such as a rechargeable battery unit. In some embodiments, energy harvesting such as piezoelectrics may be utilized to convert mechanical energy generated from footsteps of the individuals getting on and off the present invention to electrochemical energy. In some embodiments, a power management module may also be included as part of the power supply 96.

F. Operation of Preferred Embodiment

In use, the present invention will preferably be placed in a location at which it will be easy to form a routine of stepping onto the present invention on a periodic basis, such as just outside a shower or bath. The present invention is adapted to serve as a bathroom mat or rug on which an individual can stand while drying after a bath or shower. The present invention will preferably be hidden to the casual observer as well as operate as a weighing scale.

The present invention will preferably rest in a dormant sleep mode absent pressure by an individual. Thus, the present invention will preferably automatically power on when an individual steps on the mat 10 and power down after a short period of time without detection of pressure.

When an individual first steps on the present invention such as represented in FIGS. 4 and 5, pressure points on the bottom of their feet will cause the microbend inducers 40, 50 to induce microbends at specific locations of the fiber optic cables 52, 62 of the sensor arrays 50, 60.

These microbends will cause changes in light intensity which, after detection by the photodetectors 58, 68, may be utilized by the microcontroller unit 92 to create a pressure map along the X-Y mesh of the sensor arrays 50, 60 that are unique to the individual standing on the present invention. The pressure map will be comprised of a stored outer shape of the pressure caused within the sensor arrays 50, 60 by microbends induced by the individual's feet.

The pressure map generated by the individual will be used to determine the shape or morphology, size, and other unique features of the feet. This data may be stored in memory 94 to be accessed later in identifying the individual and tracking weight readings. When a new individual steps on the map that is not recognized in the existing database, a new entry will be entered and saved in memory 94 for retrieval later. When a returning individual is recognized, any new weight readings will be associated with their unique identifier to aid in tracking.

The sensor arrays 50, 60 are also utilized to record the individual's weight, which may be shown on the display 23. Timestamps may be recorded with each weight reading to aid in tracking of weight gain or weight loss. This data may be transferred to other devices, such as an application on a mobile phone or an associated website where the data may be accessed and reviewed periodically by the user. Through setting up a routine of periodically stepping on the present invention when entering or exiting the shower or bath, an individual may more efficiently manage his/her weight than previously available in the prior art.

G. Alternate Embodiment

FIGS. 8-13 illustrate an alternate embodiment of the weight management mat 10. In this exemplary embodiment, each sensor array 50, 60 has its own pair of inducer arrays 104, 114, 117, 124; with the first sensor array 50 having microbends induced by the first and second inducer arrays 104, 114 and the second sensor array 60 having microbends induced by the third and fourth inducer arrays 117, 124. As with the other described embodiments, at least one photodetector 58, 68 is utilized to detect changes in one or more light signals; with the light signal changes being induced by the inducer arrays 104, 114, 117, 124.

Figure 13:
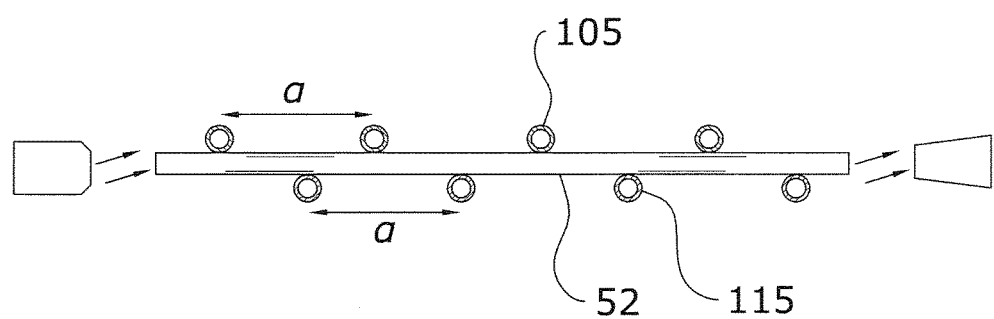
FIG. 13 is a side view of the alternate embodiment illustrating the mechanical periodicity of the sensor arrays.

With such an embodiment, the sensitivity of each sensor array 50, 60 may differ with respect to each other. For example, the first sensor array 50 may include a first sensitivity and the second sensor array 60 may include a second sensitivity. The sensitivity of a sensor array 50, 60 may be adjusted by increasing or decreasing the number of fiber optic cables 52, 62 which comprise each sensor array 50, 60. Additionally, the mechanical periodicity α, which is illustrated in FIG. 13, may be differ in the different sensor arrays 50, 60.

Such a configuration provides added utility to the present invention. For example, the first sensor array 50 could be configured for measuring weight while the second sensor array 60 could be configured for biometric identification, or vice versa. It should be appreciated that these types of functions are merely exemplary, and a wide range of other functions other than identification or weight measurement could be provided by one or more of the light sensor arrays 50, 60 in different embodiments of the present invention.

As shown in the figures, each of the inducer arrays 104, 114, 117, 124 comprise a plurality of inducers 105, 115, 118, 125. The inducers 105, 115, 118, 125 may comprise any structure capable of forming microbends in the fiber optic cables 52, 62 of the light sensor arrays 50, 60. In the embodiment shown in the figures, the first inducer array 104 comprises a plurality of first inducers 105, the second inducer array 114 comprises a plurality of second inducers 115, the third inducer array 117 comprises a plurality of third inducers 118, and the fourth inducer array 124 comprises a plurality of fourth inducers 125. Although the inducers 105, 115, 118, 125 are shown as being in parallel with each other, other configurations could be utilized.

Figure 9:
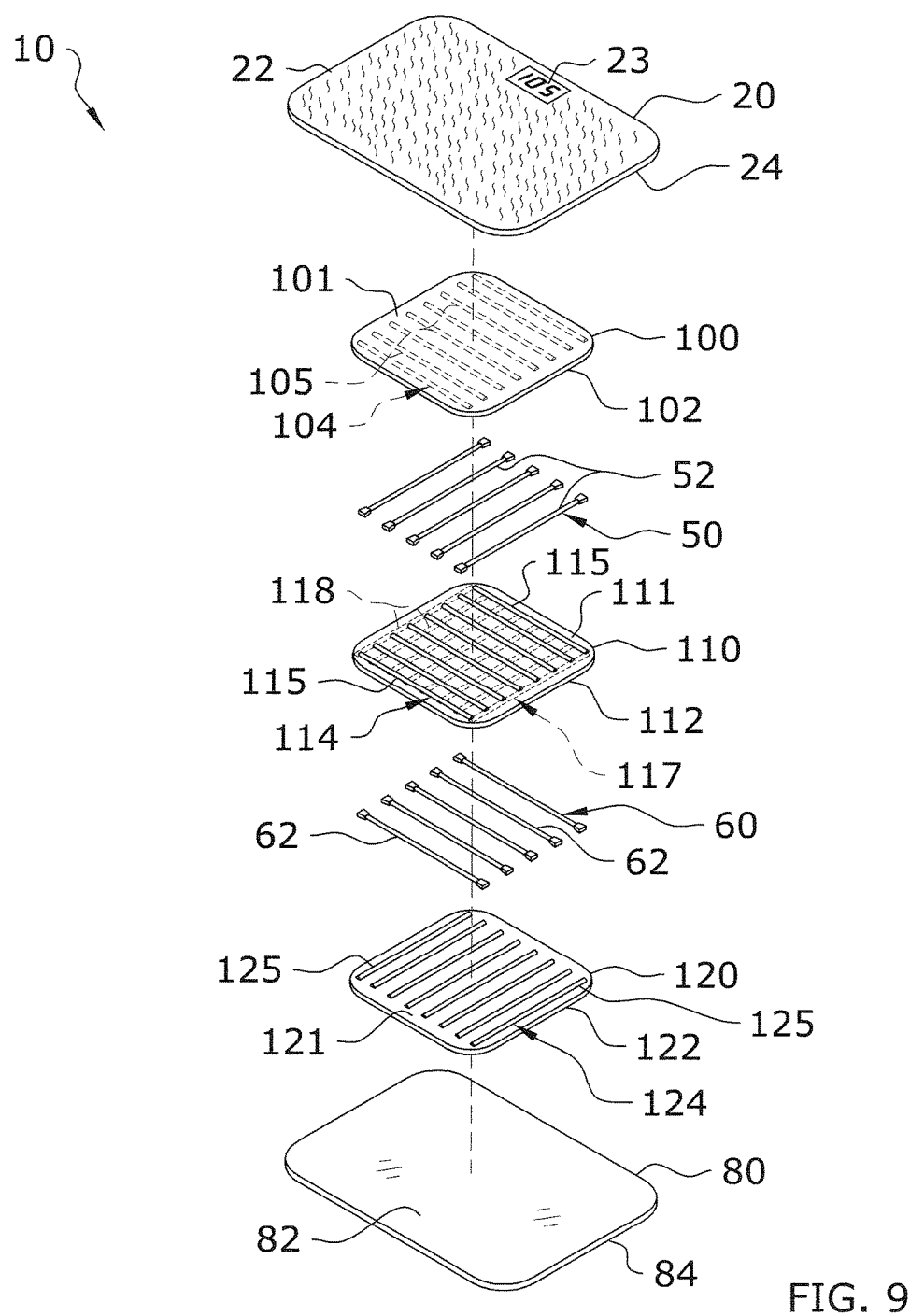
FIG. 9 is an exploded view of an alternate embodiment.
Figure 10:
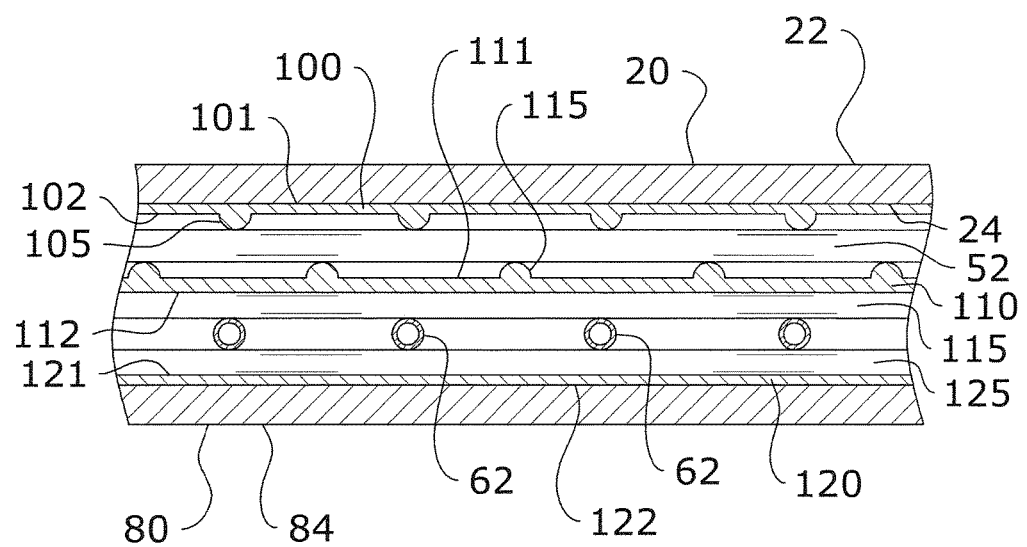
FIG. 10 is a side sectional view of an alternate embodiment.

In a preferred embodiment as shown in the figures, the inducers 105, 115, 118, 125 each comprise raised splines. As shown in FIGS. 9 and 10, the inducers 105, 115, 118, 125 may extend across inducer supports 100, 110, 120. The inducer supports 100, 110, 120 may comprise flat structures which are positioned above and below the light sensor arrays 50, 60 as shown in the figures. The spacing, positioning, orientation, shape, and configuration of the inducer supports 100, 110, 120 may vary in different embodiments of the present invention, and thus should not be construed as limited by the exemplary figures.

As best shown in FIG. 9, an exemplary embodiment includes a first inducer support 100 having an upper surface 101 and a lower surface 102. The first inducer support 100 may be positioned underneath the upper mat 20 and above the first sensor array 50 as shown in FIG. 9. The first inducer array 104 comprises a plurality of first inducers 105 which extend across the lower surface 102 of the first inducer support 100 in the exemplary embodiment of the figures.

The second inducer support 110 may include both the second inducer array 114 and the third inducer array 117. The second inducer support 110 is generally positioned below the first inducer support 100 and first sensor array 50 and above the second sensor array 60 and third inducer support 120.

In the embodiment shown in the figures, the second inducer array 114 comprises a plurality of second inducers 115 which extend across the upper surface 111 of the second inducer support 110. In such a configuration, the first and second inducer arrays 104, 114 are positioned above and below the first sensor array 50 to induce microbends therein. Thus, the first sensor array 50 is generally sandwiched between the first inducer array 104 and the second inducer array 114.

The third inducer array 117 may be positioned on the lower surface 112 of the second inducer support 110 as shown in FIG. 9. The third inducer array 117 comprises a plurality of third inducers 118 which extend across the lower surface 112 of the second inducer support 110. Alternatively, a separate support could be provided for the third inducer array 117 in some embodiments.

The third inducer support 120 comprises an upper surface 121 and a lower surface 122. The third inducer support 120 is generally positioned beneath the second inducer support 110 and the second sensor array 60. The fourth inducer array 124 comprises a plurality of fourth inducers 125 which extend across the upper surface 121 of the third inducer support 120. Thus, the third and fourth inducer arrays 117, 124 induce microbends in the second sensor array 60, with the second sensor array 60 being sandwiched between the third inducer array 117 and the fourth inducer array 124.

Figure 11:
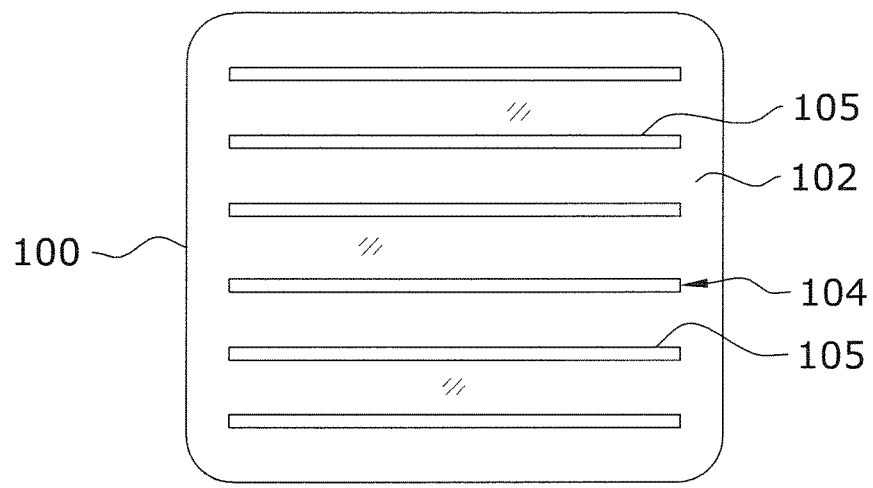
FIG. 11 is an exemplary top or bottom view of an inducer support with latitudinal or longitudinal inducers.
Figure 12:
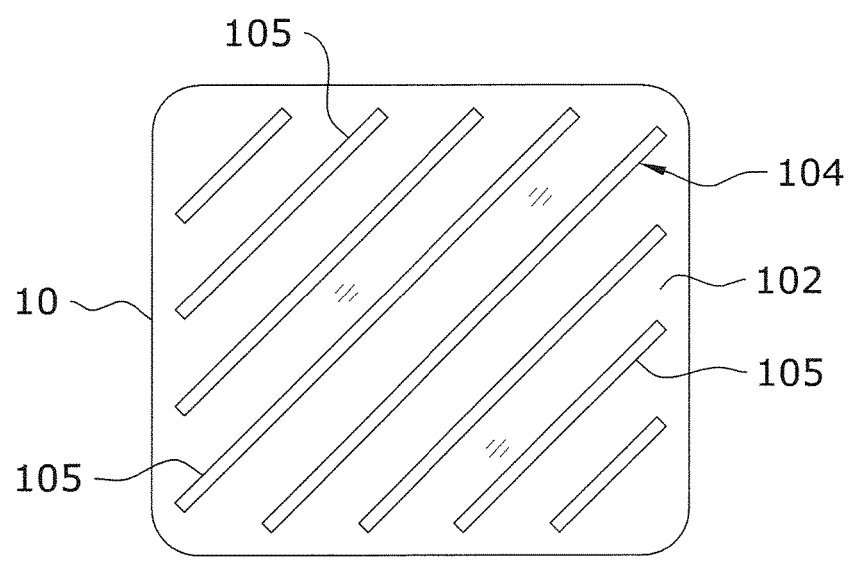
FIG. 12 is an exemplary top or bottom view of an inducer support with diagonal inducers.

It should be appreciated that the orientation of the inducers 105, 115, 118, 125 on the inducer supports 100, 110, 120 may vary in different embodiments. FIG. 11 illustrates inducers 105, 115, 118, 125 which extend latitudinally or longitudinally in a parallel orientation across the inducer support 100, 110, 120. FIG. 12 illustrates inducers 105, 115, 118, 125 which extend diagonally in a parallel orientation across the inducer support 100, 110, 120. In such a diagonal embodiment, the length of the individual inducers 105, 115, 118, 125 may vary.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A weight management mat, comprising:
an outer housing comprising an upper mat and a lower mat;
a first sensor array positioned within the outer housing, wherein the first sensor array comprises a plurality of first fiber optic cables adapted to carry a light signal;
a first inducer array positioned above the first sensor array, wherein the first inducer array comprises a plurality of first splines;
a second inducer array positioned beneath the first sensor array, wherein the second inducer array comprises a plurality of second splines, wherein the first splines are oriented perpendicularly with respect to the second splines, wherein the first inducer array and the second inducer array are adapted to induce microbends within the first sensor array;
a second sensor array positioned within the outer housing, wherein the second sensor array comprises a plurality of second fiber optic cables adapted to carry the light signal;
a third inducer array positioned above the second sensor array;
a fourth inducer array positioned beneath the second sensor array, wherein the third inducer array and the fourth inducer array are adapted to induce microbends within the second sensor array; and
at least one photodetector adapted to detect sensitivity changes of the light signal caused by the microbends.

2. The weight management mat of claim 1, wherein the third inducer array comprises a plurality of third splines and the fourth inducer array comprises a plurality of fourth splines.

3. The weight management mat of claim 2, wherein the third splines are oriented perpendicularly with respect to the fourth splines.

4. The weight management mat of claim 1, further comprising a first inducer support positioned near the upper mat.

5. The weight management mat of claim 4, wherein the first inducer array is positioned on a lower surface of the first inducer support.

6. The weight management mat of claim 5, further comprising a second inducer support positioned below the first inducer support.

7. The weight management mat of claim 6, wherein the second inducer array is positioned on an upper surface of the second inducer support.

8. The weight management mat of claim 7, wherein the third inducer array is positioned on a lower surface of the second inducer support.

9. The weight management mat of claim 8, further comprising a third inducer support positioned below the second inducer support.

10. The weight management mat of claim 9, wherein the fourth inducer array is positioned on an upper surface of the third inducer support.

11. A weight management mat, comprising:
- an outer housing comprising an upper mat and a lower mat;
- a first inducer support positioned within the housing, wherein a lower surface of the first inducer support includes a first inducer array, wherein the first inducer array comprises a plurality of first splines;
- a first sensor array positioned within the outer housing, wherein the first sensor array comprises a plurality of first fiber optic cables adapted to carry a light signal;
- a second inducer support positioned within the housing, wherein an upper surface of the second inducer support includes a second inducer array, wherein the second inducer array comprises a plurality of second splines, wherein the first splines are oriented perpendicularly with respect to the second splines, wherein a lower surface of the second inducer support includes a third inducer array, wherein the third inducer array comprises a plurality of third splines, wherein the first inducer array and the second inducer array are adapted to induce microbends within the first sensor array;
- a second sensor array positioned within the outer housing, wherein the second sensor array comprises a plurality of second fiber optic cables adapted to carry the light signal;
- a third inducer support positioned within the housing, wherein an upper surface of the third inducer support includes a fourth inducer array, wherein the fourth inducer array comprises a plurality of fourth splines, wherein the third inducer array and the fourth inducer array are adapted to induce microbends within the second sensor array; and
- at least one photodetector adapted to detect sensitivity changes of the light signal caused by the microbends.

12. The weight management mat of claim 11, wherein the first splines extend diagonally across the lower surface of the first inducer support.

13. The weight management mat of claim 11, wherein the first sensor array is adapted to measure weight of an individual.

14. The weight management mat of claim 13, wherein the second sensor array is adapted to biometrically identify an individual.

15. A weight management mat, comprising:
- an outer housing comprising an upper mat and a lower mat;
- a first inducer support positioned within the housing, wherein a lower surface of the first inducer support includes a first inducer array, wherein the first inducer array comprises a plurality of first splines oriented in parallel;
- a first sensor array positioned within the outer housing, wherein the first sensor array comprises a plurality of first fiber optic cables adapted to carry a light signal;
- a second inducer support positioned within the housing, wherein an upper surface of the second inducer support includes a second inducer array, wherein the second inducer array comprises a plurality of second splines oriented in parallel;
- wherein a lower surface of the second inducer support includes a third inducer array, wherein the third inducer array comprises a plurality of third splines oriented in parallel, wherein the first inducer array and the second inducer array are adapted to induce microbends within the first sensor array;
- a second sensor array positioned within the outer housing, wherein the second sensor array comprises a plurality of second fiber optic cables adapted to carry the light signal;
- a third inducer support positioned within the housing, wherein an upper surface of the third inducer support includes a fourth inducer array, wherein the fourth inducer array comprises a plurality of fourth splines oriented in parallel, wherein the third inducer array and the fourth inducer array are adapted to induce microbends within the second sensor array, wherein the first inducer array is perpendicular with the second inducer array, wherein the third inducer array is perpendicular with the fourth inducer array; and
- at least one photodetector adapted to detect sensitivity changes of the light signal caused by the microbends.

* * * * *

UNITED STATES PATENT AND TRADEMARK OFFICE
CERTIFICATE OF CORRECTION

PATENT NO.       : 10,082,418 B2
APPLICATION NO.  : 15/064812
DATED            : September 25, 2018
INVENTOR(S)      : Amit K. Gupta Page 1 of 1

It is certified that error appears in the above-identified patent and that said Letters Patent is hereby corrected as shown below:

In the Specification

Column 6, Lines 3-5, "These pressure points are utilized to create microbeads within the sensor arrays 50, 60 which are detectable via usage of photodetectors 58, 68" should read --These pressure points are utilized to create microbends within the sensor arrays 50, 60 which are detectable via usage of photodetectors 58, 68--

Column 7, Lines 7-10, "In some embodiments, the functions of the sensor array controller 90 may be perfot med partially or wholly by the microcontroller unit 92 described below" should read --In some embodiments, the functions of the sensor array controller 90 may be performed partially or wholly by the microcontroller unit 92 described below--

Signed and Sealed this
Sixth Day of November, 2018

Andrei Iancu
*Director of the United States Patent and Trademark Office*